United States Patent
Teramura et al.

(10) Patent No.: US 6,324,465 B1
(45) Date of Patent: Nov. 27, 2001

(54) AUTOMATIC CRUISING CONTROL APPARATUS

(75) Inventors: Eiji Teramura, Okazaki; Takao Nishimura, Nagoya; Akira Isogai, Anjo; Yoshie Samukawa; Keiji Matsuoka, both of Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/534,344

(22) Filed: Mar. 24, 2000

(30) Foreign Application Priority Data

Mar. 26, 1999 (JP) .................................................. 11-084023

(51) Int. Cl.⁷ ............................. G06F 7/00; G06F 17/00
(52) U.S. Cl. .................................. 701/96; 701/70; 701/79; 701/93; 701/301; 340/438; 340/439; 180/170
(58) Field of Search .................................. 701/70, 65, 79, 701/91, 93, 96, 301; 340/425.5, 435, 436, 438, 439, 903; 180/169, 170, 197; 123/492, 493, 349

(56) References Cited

U.S. PATENT DOCUMENTS

| | | | |
|---|---|---|---|
| 4,095,551 | 6/1978 | Paul et al. | 340/435 |
| 5,594,645 * | 1/1997 | Nishimura et al. | 701/96 |
| 5,629,669 * | 5/1997 | Asano et al. | 340/436 |
| 5,752,214 * | 5/1998 | Minowa et al. | 701/111 |
| 5,902,345 * | 5/1999 | Minowa et al. | 701/96 |
| 6,044,321 * | 3/2000 | Nakamura et al. | 701/96 |
| 6,058,347 * | 5/2000 | Yamamura et al. | 701/96 |

FOREIGN PATENT DOCUMENTS

| | | |
|---|---|---|
| 61-175130 | 8/1986 | (JP) . |
| 5-310108 | 11/1993 | (JP) . |
| 6-248991 | 9/1994 | (JP) . |
| 6-278500 | 10/1994 | (JP) . |
| 7-156709 | 6/1995 | (JP) . |
| 8-142717 | 6/1996 | (JP) . |
| 8-268110 | 10/1996 | (JP) . |
| 2606218 | 2/1997 | (JP) . |
| 11-70823 | 3/1999 | (JP) . |

OTHER PUBLICATIONS

U.S.S.N. 09/353,944.

* cited by examiner

Primary Examiner—William A. Cuchlinski, Jr.
Assistant Examiner—Gertrude Arthur
(74) Attorney, Agent, or Firm—Law Offices of David G. Posz

(57) ABSTRACT

In automatic cruising control according to the distance between the preceding and this vehicle (inter-vehicle distance), acceleration and deceleration force information is visually or acoustically provided to the driver. A value corresponding to an actual inter-vehicle distance and actual acceleration and deceleration of the vehicle is detected to control according to a target acceleration and deceleration value. The target acceleration and deceleration value is determined so as to equalize the value to a target value corresponding to a target inter-vehicle distance. The driver of the vehicle is informed that at least one of the target acceleration and deceleration value and the actual acceleration and deceleration of the vehicle reaches a predetermined threshold value. The level of acceleration and deceleration force in automatic cruising may be informed. Information may be provided to the driver when the acceleration and deceleration reaches the upper or lower limit or maximum value.

9 Claims, 7 Drawing Sheets

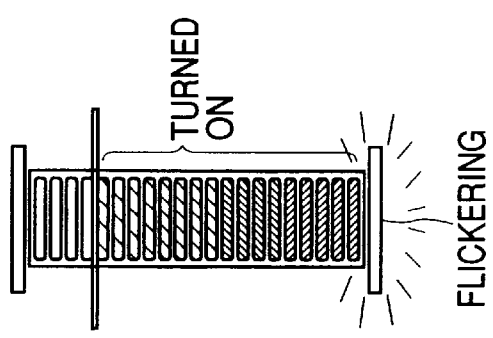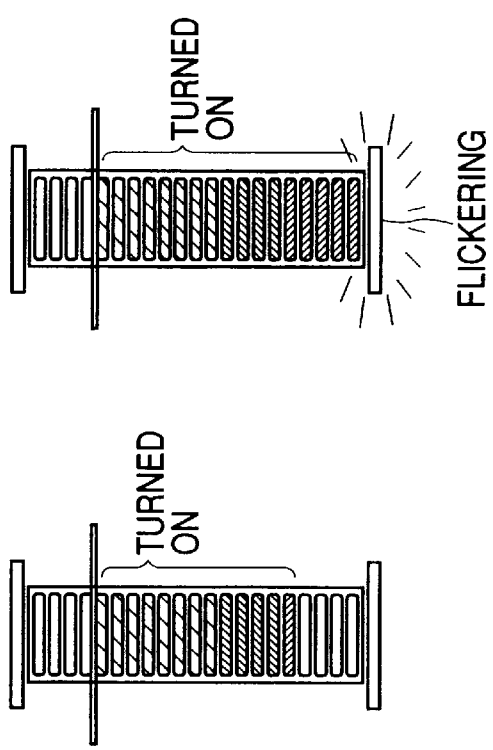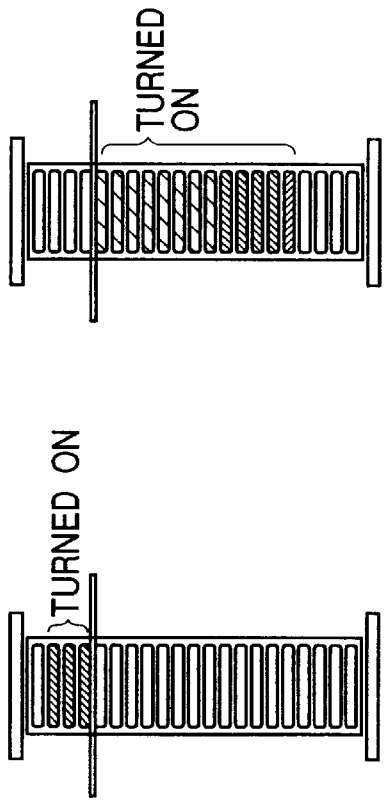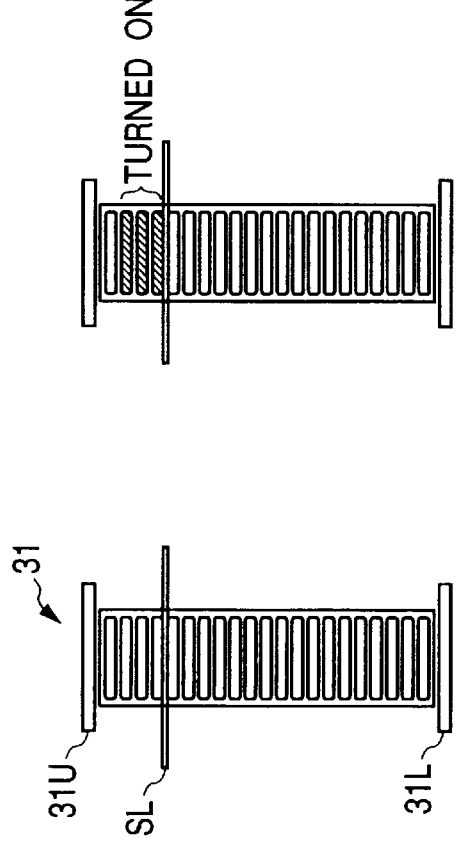

AUTOMATIC CRUISING CONTROL APPARATUS

BACKGROUND OF THE INVENTION

1. Field of the Invention

This invention relates to an automatic cruising control apparatus for controlling a distance between the preceding vehicle on the same lane and this vehicle.

2. Description of the Prior Art

An automatic cruising control apparatus for controlling a distance between the preceding vehicle on the same lane and this vehicle by controlling the throttle and the brake is known.

Such a prior art automatic cruising control apparatus is disclosed in Japanese patent application provisional publication No. 61-175130. This prior art automatic cruising control apparatus detects the distance between the preceding vehicle on the same lane and this vehicle (inter-vehicle distance) by an ultrasonic radar or the like and controls the throttle valve and the brake in accordance with the variation of the inter-vehicle distance.

An automatic braking apparatus disclosed in Japanese patent application provisional publication No. 5-310108 controls the braking pressure in accordance with deviation of the deceleration of the vehicle from the target deceleration calculated from the relation to the target in front of the vehicle.

Moreover, an automatic cruising control apparatus for maintaining the velocity of the vehicle by controlling the throttle valve in accordance with the deviation of the actual velocity from the predetermined velocity value is known.

Moreover, Japanese patent publication No. 2606218 discloses an automatic cruising apparatus which decelerates the vehicle in response to a deceleration command by applying a brake oil pressure to hydraulic actuators, wherein an upper limit of deceleration is specified.

Moreover, U.S. Pat. No. 4,095,551 discloses an indicating arrangement for a distance warning system in motor vehicles which are equipped with measuring and evaluating devices for determining the distance of the vehicle to an obstacle disposed in front thereof and for determining the approach velocity to this vehicle; a desired value is thereby derived from the determined values for the brake deceleration necessary for the avoidance of a collision and an actual value is determined from the actual deceleration values attained during the braking operation whereby only the difference or the ratio of desired and actual value is thereby indicated to the driver.

SUMMARY OF THE INVENTION

The aim of the present invention is to provide a superior automatic cruising control apparatus.

According to the present invention there is provided a first automatic cruising control apparatus to be mounted in a vehicle. The first automatic cruising control apparatus detects a value corresponding to an actual distance between the vehicle and the preceding vehicle. The first automatic cruising control apparatus detects actual acceleration and deceleration of the vehicle. The first automatic cruising control apparatus controls the acceleration and deceleration of the vehicle in accordance with a target control value. The first automatic cruising control apparatus determines the target control value so as to equalize the value to a target value corresponding to a target distance between the vehicle and the preceding vehicle. The first automatic cruising control apparatus informs a driver of the vehicle that at least one of the target control value and an actual control value of the vehicle reaches a predetermined threshold value. The target control value may indicates a target acceleration and the actual control value may indicate an actual acceleration.

According to the present invention there is provided a second automatic cruising control apparatus to be mounted in a vehicle. The second automatic cruising control apparatus detects a value corresponding to an actual distance between the vehicle and a preceding vehicle. The second automatic cruising control apparatus detects actual acceleration and deceleration of the vehicle. The second automatic cruising control apparatus controls the acceleration and deceleration of the vehicle in accordance with a target control value. The second automatic cruising control apparatus determines the target control value so as to equalize the value to a target value corresponding to a target distance between the vehicle and the preceding vehicle. The second automatic cruising control apparatus informs a driver of the vehicle of at least one of the target control value and an actual control value of the vehicle. The target control value may indicates a target acceleration and the actual control value may indicate an actual acceleration.

According to the present invention there is provided a third automatic cruising control apparatus mounted in a vehicle. The third automatic cruising control apparatus detects a value corresponding to an actual distance between the vehicle and a preceding vehicle. The third automatic cruising control apparatus controls acceleration and deceleration of the vehicle so as to equalize the value to a target value corresponding to a target distance between the vehicle and the preceding vehicle, wherein for the acceleration and deceleration controlling there are a plurality of decelerators having different deceleration abilities to the vehicle. A part of a plurality of the decelerators are selectively operated. The third automatic cruising control apparatus informs a driver of the vehicle that a total of deceleration derived by a part of a plurality of the decelerators agrees with the maximum deceleration force in a plurality of the decelerators, when the total of deceleration derived by the part of a plurality of the decelerators agrees with the maximum deceleration force in a plurality of the decelerators.

According to the present invention there is provided a fourth automatic cruising control apparatus mounted in a vehicle. The fourth automatic cruising control apparatus detects a value corresponding to an actual distance between the vehicle and a preceding vehicle. The fourth automatic cruising control apparatus controls acceleration and deceleration of the vehicle so as to equalize the value to a target value corresponding to a target distance between the vehicle and the preceding vehicle. As the acceleration and deceleration control means, there are a plurality of decelerators having different deceleration abilities to the vehicle. A part of a plurality of the decelerators are selectively operated. The fourth automatic cruising control apparatus informs a driver of the vehicle of the part of a plurality of the decelerators which is (are) being operated.

BRIEF DESCRIPTION OF THE DRAWINGS

The object and features of the present invention will become more readily apparent from the following detailed description taken in connection with the accompanying drawings in which:

FIGS. 5A to 5D are illustrations of the embodiment showing operation conditions of the display shown in FIG. 1;

The same or corresponding elements or parts are designated as like references throughout the drawings.

DETAILED DESCRIPTION OF THE INVENTION

This invention is provided to improve unpleasant feeling in a driver using an automatic cruising apparatus which was conventionally inherent. For example, this invention improves unpleasant feeling when the deceleration (acceleration) force by the automatic cruising apparatus reaches the maximum value is improved. Moreover, this invention improves unpleasant feeling when the deceleration (acceleration) force by the automatic cruising apparatus has not reached the maximum value but the driver cannot recognize the margin of the deceleration (acceleration) force.

Hereinbelow will be described an embodiment of this invention with reference to FIGS. 1 to 6.

Figure 1:
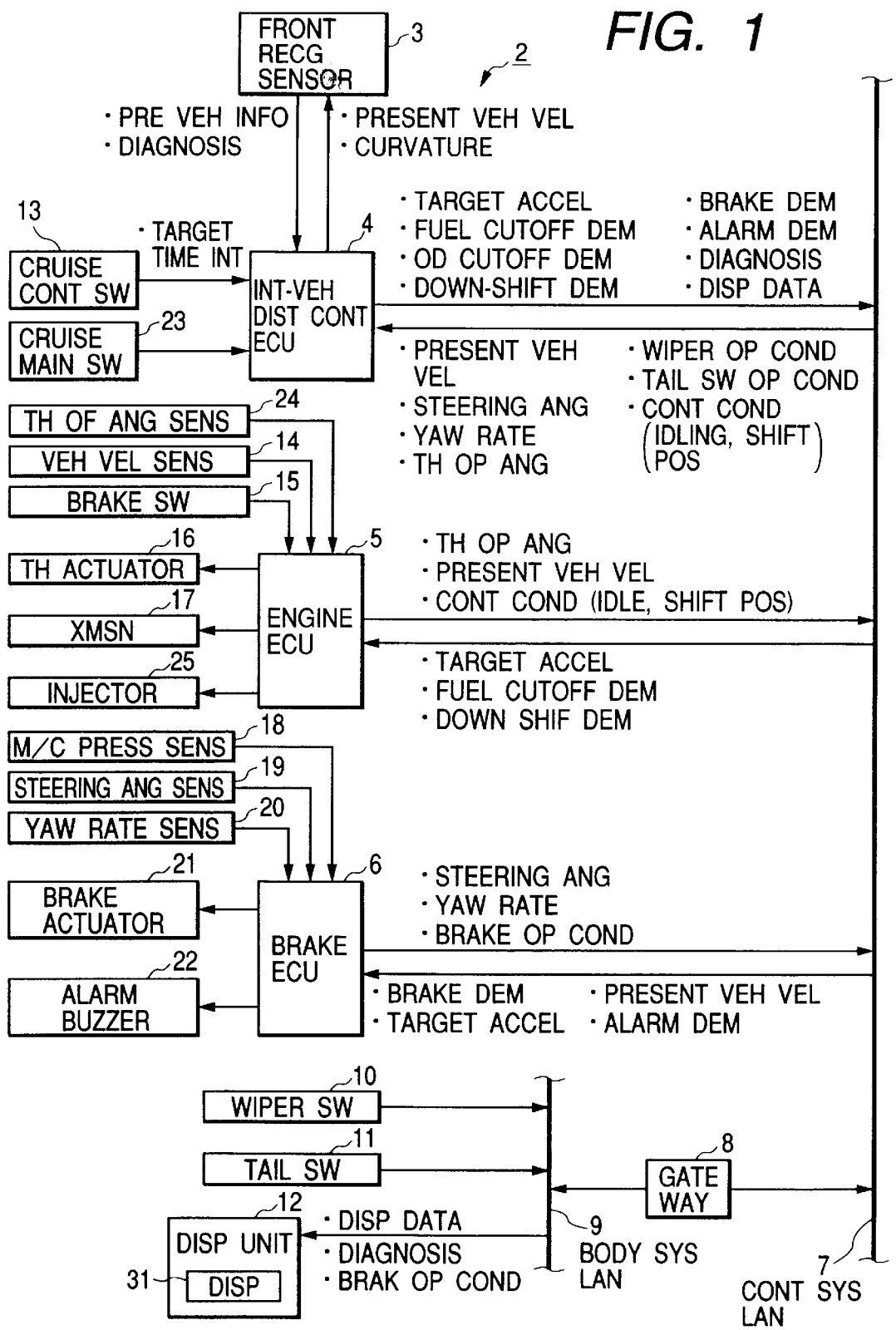
FIG. 1 is a block diagram of an embodiment showing outline structure of an automatic cruising control apparatus.

FIG. 1 shows an outline structure of an automatic cruising control apparatus 2 of this embodiment. The automatic cruising control apparatus 2 is mounted on a vehicle equipped with a gasoline engine as an internal combustion engine and performs automatic cruising controlling to control a driving force and deceleration forces so that an actual inter-vehicle distance (actual distance between the preceding vehicle and this vehicle) agrees with a target distance between the preceding vehicle and this vehicle.

The automatic cruising control apparatus 2 mainly includes a front recognizing sensor 3, an inter-vehicle distance controlling electronic control unit (hereinafter referred to as an inter-vehicle distance control ECU) 4, an engine controlling electronic controlling unit (hereinafter, referred to as an engine control ECU) 5, and a brake controlling electronic control unit (hereinafter referred to as a brake control ECU) 6.

The front recognizing sensor 3 includes a known radar sensor or a proximity sensor using ultrasonic waves, radio waves, a laser ray, or an infrared ray. For example, a radar sensor mainly includes a scanning distance measuring unit and a microprocessor. The scanning distance measuring unit emits and scans ultrasonic waves, radio wave, a laser ray, or an infrared ray over a predetermined angle range in a width direction of the vehicle and detects a travelling direction of the preceding vehicle (travelling angle) to this vehicle, an actual inter-vehicle distance between the preceding vehicle and this vehicle, and a relative velocity between the preceding vehicle and this vehicle in accordance with the reflected ultrasonic waves, radio wave, laser ray, or infrared ray. The microprocessor calculates a probability that the preceding vehicle is travelling on the same lane in accordance with the travelling angle, the actual inter-vehicle distance, and the relative velocity of the preceding vehicle detected by the scanning distance measuring unit and a present velocity of this vehicle and a radius of curvature inputted from the inter-vehicle distance control ECU 4. The front recognizing sensor 3 supplies preceding vehicle information including the travelling angle, the actual inter-vehicle distance, the relative velocity, the probability that the preceding vehicle is travelling on the same lane and self-diagnosis of the front recognizing sensor 3 to the inter-vehicle distance control ECU 4.

Each of the inter-vehicle distance control ECU 4, the engine control ECU 5, and the brake control ECU 6 includes a computer unit including a CPU, a ROM, a RAM, and I/O circuits and is supplied with a supply power from a battery mounted on the vehicle (not shown) when an ignition switch (not shown) is turned on. The inter-vehicle distance control ECU 4, the engine control ECU 5, and the brake control ECU 6 are coupled to each other through a control system LAN (Local Area Network) 7.

The control system LAN 7 is coupled to a body system LAN 9 through a gate way 8. The body system LAN 9 is connected to a wiper switch 10, a tail switch 11, and a display unit 12.

The wiper switch 10 is provided to stop the automatic cruising control when a wiper (not shown) is operated. That is, when it rains, it is difficult to obtain accurate proceeding vehicle information from the front recognizing sensor 3. Accordingly, the automatic cruising control is stopped. Particularly, if a laser radar sensor is used as the front recognizing sensor 3, it is difficult obtain accurate preceding vehicle information in that condition because rain drops obstacle propagation of the laser ray.

The tail switch 11 is, as mentioned later, provided to reduce probability of collision between the preceding vehicle and this vehicle by compensating a target inter-vehicle distance (target distance between the preceding vehicle and this vehicle) set by the driver with a cruise control switch 13 toward a greater value when a road surface is dark due to night or fog.

The display unit 12 is provided on an instrument panel of the vehicle and displays display data, diagnosis data, and brake operation condition data mentioned later.

Moreover, a display 31 as an informing means for displaying an operation condition of the automatic cruising control apparatus 2 is provided on the display unit 12.

The inter-vehicle distance control ECU 4 is connected to the cruise main switch 23, and a cruise control switch 13. The cruise main switch 23 is a power switch for supplying a supply power to the inter-vehicle distance ECU4 to activate the inter-vehicle distance ECU 4. The cruise control switch 13 is provided to set a time interval necessary for travelling a distance corresponding to the target inter-vehicle distance (target distance between the preceding vehicle and this vehicle) in the automatic cruise control mode.

The inter-vehicle distance control ECU 4 calculates the radius of a curvature and a target acceleration (a target control value) and generates signals representing a fuel cutoff demand, an overdriving (OD) cutoff demand, a down-shifting demand, a braking demand, an alarming demand, and display data, in accordance with respective signals representing the target interval inputted from the cruise control switch 13, the preceding vehicle information and the diagnosis data inputted from the front recognizing sensor 3, a throttle opening angle (degree), the present velocity, control condition data (idling control condition, a shift position of a transmission, etc.) inputted from the engine ECU5, a steering angle and a yaw rate inputted from the brake ECU 6, and operation conditions of the wiper switch 10 and the tail switch 11.

Moreover, the inter-vehicle distance control ECU 4 supplies respective signals representing the target acceleration, the fuel cutoff demand, the overdrive cutoff demand, and the down-shifting demand to the engine ECU 5 and supplies respective signals representing the target acceleration, a brake demand, an alarming demand to the brake ECU 6, and supplies respective signals representing display data and the diagnosis to the display unit 12 through the LANs 7 and 9 and the gate way 8.

The engine ECU 5 is connected to a throttle opening angle sensor 24, a vehicle velocity sensor 14, and a brake switch 15. The throttle opening angle sensor 24 detects an actual opening angle of a throttle valve (not shown) of the gasoline engine. The vehicle velocity sensor 14 detects a velocity of the vehicle in accordance with rotating speeds of respective wheels (not shown) of the vehicle. The brake switch 15 detects the presence or the absence of depression of a brake pedal (not shown) of the vehicle by the driver.

The engine ECU 5 drives a throttle actuator 16, a transmission 17, and an injector 25 in accordance with respective signals inputted from the throttle opening angle sensor 24, the vehicle velocity sensor 14, the brake switch 15, and respective signals representing the target acceleration, the fuel cutoff demand, the overdriving cutoff demand, the down-shifting demand.

The throttle actuator 16 adjusts the opening angle of the throttle valve. An actuator driving circuit for the throttle actuator 16 generates a drive signal for controlling a motor provided inside the throttle actuator 16 and a drive signal for controlling a clutch in accordance with driving commands from the engine ECU 5. In response to the drive signals, the rotating direction and the rotating speed of the motor is controlled and connecting and disconnecting in the clutch is controlled, so that the rotation of the motor is transmitted to the throttle valve of the engine through the clutch. As the result, the engine ECU 5 can adjust the driving force from the engine, so that the velocity of the vehicle can be controlled. Moreover, the transmission 17 is of a five-speed type. The reduction gear ratio of the fourth gear position is "1" and the reduction gear ratio of the fifth gear position is smaller than that of the fourth gear position (for example, 0.7), which is so-called the four speed plus overdrive structure.

The injector 25 injects fuel into an intake manifold (not shown).

The engine ECU 5 calculates the present vehicle velocity in accordance with the above-mentioned signals and sets optimum control conditions (idling control condition, a shift position of the transmission, etc.). More over, the engine ECU 5 supplies signals representing the actual throttle opening angle (actual control value), the present vehicle velocity, and control conditions to inter-vehicle distance control ECU 4 and supplies a signal representing the present vehicle velocity to the brake ECU 6.

The brake ECU 6 is connected to a master cylinder (M/C) pressure sensor 18, a steering sensor 19, a yaw rate sensor 20. The master cylinder pressure sensor 18 detects an oil pressure (a master cylinder pressure) of the master cylinder in the brake unit. The steering sensor 19 detects a steering angle of the vehicle. The yaw rate sensor 20 detects a yaw rate of the vehicle.

The brake ECU 6 drives and controls the brake actuator 21 and an alarm buzzer 22 in accordance with respective signals inputted from the master cylinder pressure sensor 18, the steering sensor 19, and the yaw rate sensor 20, and respective signals representing the target acceleration, a brake demand, and the alarming demand inputted from the inter-vehicle distance control ECU 4.

The brake unit (not shown) includes a master cylinder, wheel cylinders, increasing pressure control valves, decreasing pressure control valves, a resolver, and the brake actuator 21. The wheel cylinders are arranged to respective wheels of the vehicle. The master cylinder pressure from the master cylinder is supplied to respective wheel cylinders through respective increasing pressure control valves. Moreover, the master cylinder generates the master cylinder pressure by depressing a brake pedal by the driver or by the operation of the brake actuator 21. Further, oil pressures from the respective wheel cylinders are supplied to the resolver through respective pressure decreasing valves. Moreover, the brake actuator 21 controls the braking operation by controlling of increasing and decreasing pressures in the master cylinder through duty controlling between the atmospheric pressure and a negative pressure from the engine in accordance with the controlling by the brake ECU 6.

The alarm buzzer 22 is operated in response to a signal representing an alarming demand inputted from the inter-vehicle distance control ECU 4.

The brake ECU 6 supplies signals representing the steering angle, and the yaw rate to the inter-vehicle distance control ECU 4 and supplies signals representing the brake operation condition as the result of the command to the brake actuator 21 to the display unit 12 through the respective LANs 7 and 9 and the gate way 8.

Moreover, components in the automatic cruising control apparatus 2 other than the ECUs 4 to 6 are supplied with the supply power from the battery mounted on the vehicle when the ignition switch is turned on.

Figure 2:
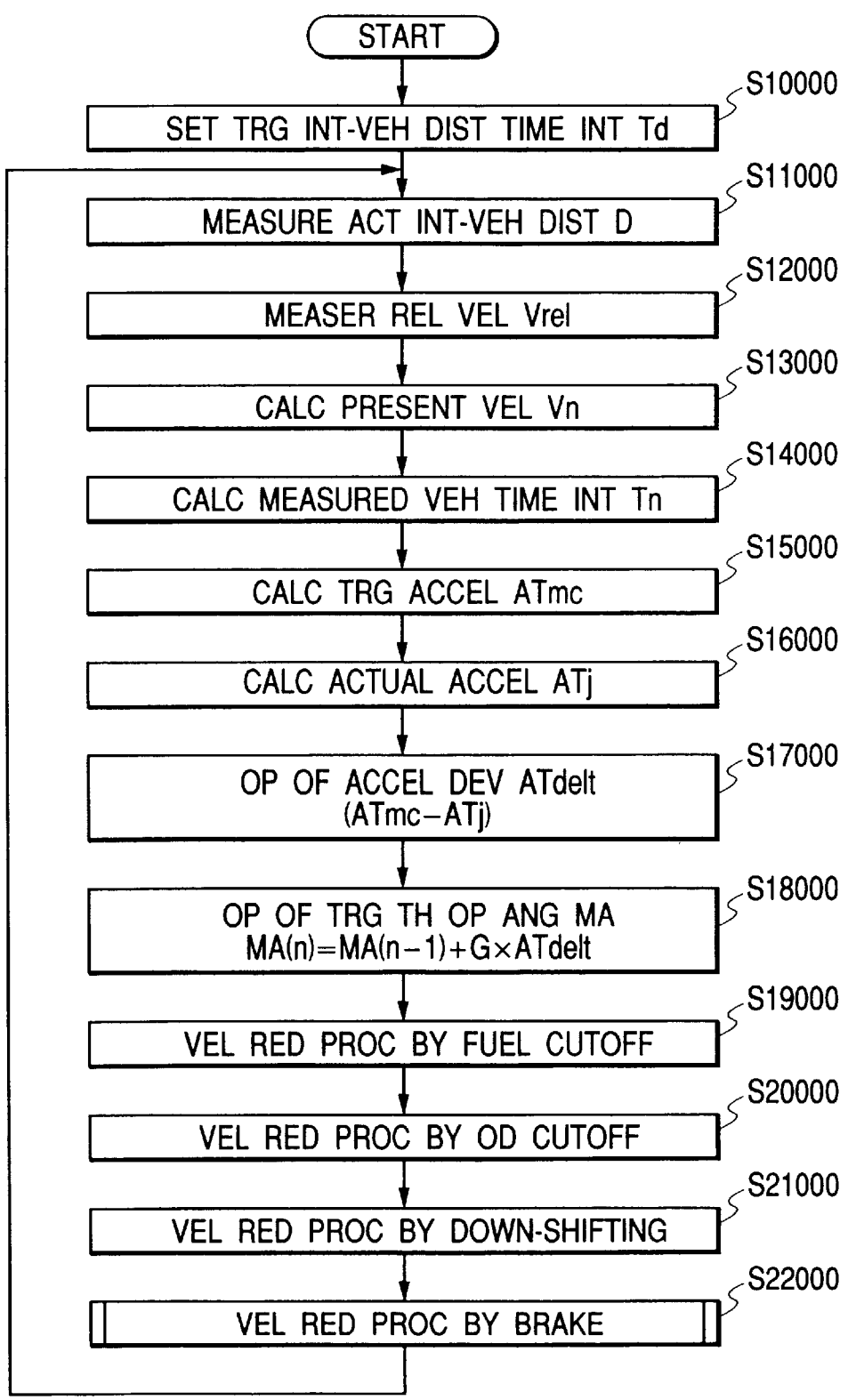
FIG. 2 depicts a flow chart of the embodiment showing the automatic cruising operation.
Figure 3:
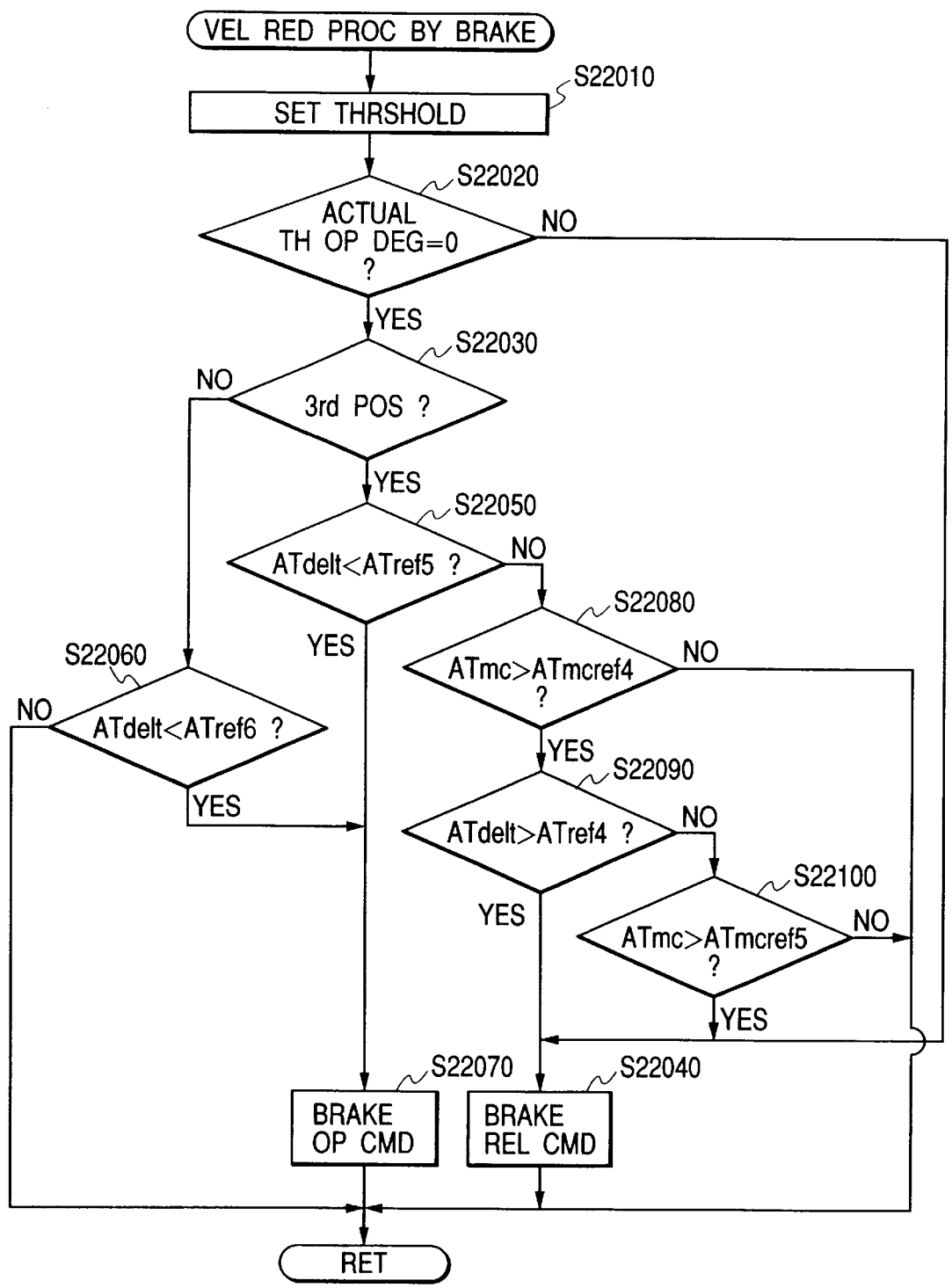
FIG. 3 depicts a flow chart of the embodiment showing a part of processes in FIG. 2.

FIG. 2 depicts a flow chart of this embodiment showing the automatic cruising operation. FIG. 3 depicts a flow chart of this embodiment showing a part of processing in FIG. 2.

Operation of the automatic cruising control apparatus will be described in detail with reference to flow charts in FIGS. 2 and 3.

When the ignition switch and the cruising main switch 23 are turned on, so that the ECUs 4 to 6 and the front recognizing sensor 3 are activated. The ECUs 4 to 6 and the front recognizing sensor 3 executes processes in accordance with the programs stored in the ROMs and RAMs included therein. However, the programs may be recorded on other recording mediums such as a floppy disc, a magneto-optical disc, a CD-ROM, and a hard disc, etc. and are loaded in the ECU 4 to 6 and the front recognition sensor 3 to activate them.

As shown in FIG. 2, at first, in step S10000, the inter-vehicle distance control ECU 4 reads the target time interval set by the cruise control switch 13 and sets a target inter-vehicle distance time interval Td corresponding the target distance between vehicles. This target inter-vehicle distance time interval corresponds to the setting value of this invention. The reason why the target inter-vehicle distance time interval is used for setting the target inter-vehicle distance is that it is easier for driver to accurately recognize the actual time interval corresponding to the inter-vehicle distance than to recognize the actual distance between vehicles. This is provided to moderate unpleasant feeling in setting the automatic cruising control.

Next, in step S11000, the front recognizing sensor 3 determines the preceding vehicle to be a target of the automatic cruising control in accordance with the radius R of a curvature of the travelling condition of this vehicle inputted from the inter-vehicle distance control ECU 4 and measures the actual distance D between this vehicle (own vehicle) and the preceding vehicle.

Next in step S12000, the front recognizing sensor 3 measures the relative velocity Vrel between the preceding vehicle and this vehicle.

Next, in step S13000, the engine ECU 5 calculates the present velocity Vn in accordance with the signal inputted from the vehicle velocity sensor 14.

Next in step S14000, the inter-vehicle distance control ECU 4 calculates the inter-vehicle distance time interval Tn (sec) in accordance with the actual distance D between the vehicle and the preceding vehicle and the present vehicle velocity Vn.

$$Tn = D \times 3.6/Vn \quad (1)$$

Next, in step S15000, the inter-vehicle distance control ECU 4 calculates the target acceleration ATmc. That is, as shown in Eq. (2), the inter-vehicle distance control ECU 4 calculates an inter-vehicle distance time interval deviation (difference) Tde in accordance with the target inter-vehicle distance time interval Td and the calculated inter-vehicle distance time interval Tn. Next, the target acceleration ATmc is obtained by referring a predetermined data map of the target acceleration (deceleration) in accordance with a value Vr-filter obtained by the annealing operation to the relative velocity Vrel.

$$Tde = Tn - Td \quad (2)$$

Next in S16000, the inter-vehicle distance control ECU 4 calculates the actual acceleration ATj of this vehicle from variation of the present velocity Vn.

In step S17000, the inter-vehicle distance control ECU 4 calculates the acceleration deviation ATdelt in accordance with the target speed ATmc and the actual acceleration ATj.

$$ATdelt = ATmc - ATj \quad (3)$$

Next, in step S18000, the engine ECU 5 calculates the target throttle opening angle MA(n) in accordance with the target throttle opening angle MA(n−1) calculated in the previous processing routine in accordance with the following equation, the acceleration deviation ATdelt, and the gain G of the coefficients.

$$MA(n) = MA(n-1) + G \times ATdelt \quad (4)$$

The engine ECU 5 controls the throttle opening angle by driving and controlling the throttle actuator 16 in accordance with the target throttle opening angle MA to adjust the output of the gasoline engine.

If the controlling of the throttle actuator 16 does not provide sufficient reduction in the velocity, the inter-vehicle distance control ECU 4 and the engine ECU 5 effect further velocity reducing operation by cutting off the fuel in step S19000. Moreover, in step S20000, the inter-vehicle distance control ECU 4 and the engine ECU 5 effect the velocity reduction operation by stopping the overdriving (OD). In the following step S21000, the inter-vehicle distance control ECU 4 and the engine ECU 5 effect the velocity reduction processing by the down-shifting. Finally, the inter-vehicle distance control ECU 4 and the brake ECU 6 effect the velocity reduction processing by the brake. Here, the braking force to the vehicle increases in order of the velocity reduction processing by cutting off fuel, the velocity reduction processing by the stopping the overdriving, the velocity reduction processing by down-shifting, and the velocity reduction processing by the brake. That is, each velocity reduction processing is, or a part of velocity reduction processes are, effected in accordance with increase in the required braking force to the vehicle and the velocity reduction to the vehicle is controlled stepwise.

In the velocity reduction processing by the cutting off fuel in step S19000, the inter-vehicle distance control ECU 4 supplies a signal representing the demand for cutting off fuel to the engine ECU 5 to conduct the fuel cutting off operation command. Then, the engine ECU 5 stops the fuel injection into the injector 25 in accordance with the signal representing the fuel-cutting-off demand. As the result, supplying the fuel to the engine is stopped and engine braking is developed. The engine braking reduces the velocity of the vehicle.

In the velocity reduction process in step S20000 by overdriving cutting off, the inter-vehicle distance control ECU 4 supplies a signal representing the overdriving cutoff demand to the engine ECU5 to command to cut off the overdriving. Then, the engine ECU 5, in response to the signal representing the overdriving cutoff demand, performs down-shifting to the fourth shift position when the shift position of the transmission 17 is at the fifth shift position, i.e., at the overdriving shift position. As the result, down-shifting from the fifth shift position to the fourth shift position generates a strong engine brake force which decreases the velocity of the vehicle.

In the velocity reduction process in step S21000 by down-shifting, the inter-vehicle distance control ECU 4 supplies a signal representing the down-shifting demand to the engine ECU 5 to perform down-shift operation. Then, the engine ECU 5, in response to the signal representing the down-shifting demand, performs down-shifting from the fourth shift position to the third shift position when the shift position of the transmission 17 is at the fourth shift position. As the result, down-shifting from the fourth shift position to the third shift position generates a further strong engine brake force which decreases the velocity of the vehicle.

In step S22000 (sub-routine), the inter-vehicle distance control ECU 4 and the brake ECU 6 execute the velocity reduction process by the brake. FIG. 3 depicts a flow chart of of this embodiment showing the process of the sub-routine of step S22000.

In step S22010, the inter-vehicle distance control ECU 4 sets respective threshold values ATref4 to Atref6, ATmcref4, and ATmcref5 which are used in the steps hereinbelow.

Respective threshold values ATref5 and ATref6 have negative values and the threshold value ATref4 has a positive value. Moreover, the threshold value ATref5 is greater than the value of the threshold value ATref6 to prevent the tendency that the brake is not operated because velocity reduction has occurred by down-shifting.

The threshold value ATmcref4 has a negative value and the threshold value ATmcref5 has a negative value or a value around zero. Moreover, the threshold value ATmcref4 is smaller than the threshold value ATmcref5 (ATmcref4 <ATmcref5<0(≈0)).

Next, in step S22020, the inter-vehicle distance control ECU 4 supplies the actual throttle opening angle detected by the throttle opening angle sensor 24 to the engine ECU 5 and judges whether the actual throttle opening angle is fully open (=0°). If the actual throttle opening angle is fully open, (Yes, in step S22020), processing proceeds to step S22030 and if the actual throttle opening angle is not fully open (No, in step S22020), processing proceeds to step S22040.

In step S22030, the inter-vehicle distance control ECU 4 judges whether the signal representing the control condition of the shift position of the transmission 17 inputted from the engine ECU 5 corresponds to the third shift position. Then, if the shift position of the transmission 17 corresponds to the third shift position (Yes in step S22030), processing proceeds to step S22050 and if the shift position does not correspond to the third shift position (No, in step S22030), processing proceeds to step S22060.

In step S22050, the inter-vehicle distance control ECU 4 compares the acceleration deviation ATdelt with the threshold value ATref5. If the acceleration deviation ATdelt is smaller than the threshold value ATref5 (ATdelt<ATref5, Yes, in step S22050), processing proceeds to step S22070 and if the acceleration deviation ATdelt is equal to or greater than the threshold value ATref5 (ATdelt≧ATref5, No, in step S22050), processing proceeds to step S22080.

In step S22060, the inter-vehicle distance control ECU 4 compares the acceleration deviation ATdelt with the threshold value ATref6. If the acceleration deviation ATdelt is smaller than the threshold value ATref6 (ATdelt<ATref6, Yes, in step S22060), processing proceeds to step S22070 and if the acceleration deviation ATdelt is equal to or greater than the threshold value ATref6 (ATdelt≧ATref6, No, in step S22060), processing returns to the main routine and jumps to step S11000 to repeat the operation.

In step S22070, the inter-vehicle distance control ECU 4 supplies a signal representing the braking demand to the brake ECU 6 to perform braking and returns to the main routine and jumps to step S11000 to repeat the operation.

Moreover, in step S22080, the inter-vehicle distance control ECU 4 compares the target acceleration ATmc with the threshold value ATmcref4. If the target acceleration ATmc is greater than the threshold value ATmcref4 (ATmc>ATmcref4, Yes, in step S22080), processing proceeds to step S22090 and if the target acceleration ATmc is equal to or smaller than the threshold value ATmcref4 (ATmc≦ATmcref4, No, in step S22080), processing returns to the main routine and jumps to step S11000 to repeat the operation.

In Step S22090, the inter-vehicle distance control ECU 4 compares the acceleration deviation ATdelt with the threshold value ATref4. If the acceleration deviation ATdelt is greater than the threshold value ATref4 (ATdelt>ATref4, Yes in step S22090), processing proceeds to step S22040 and if the acceleration deviation ATdelt is equal to or smaller than the threshold value ATref4 (ATdelt≦vATref4, No in step S22090), processing proceeds to step S22100.

In Step S22100, the inter-vehicle distance control ECU 4 compares the target acceleration ATmc with the threshold value ATmcref5. If the target acceleration ATmc is greater than the threshold value ATmcref5 (ATmc>ATmcref5, Yes, in step S22100), processing proceeds to step S22040 and if the target acceleration ATmc is equal to or smaller than the threshold value ATmcref5 (ATmc<ATmcref5, No, in step S22100), processing returns to the main routine and jumps to step S11000 to repeat the operation.

In step S22040, the inter-vehicle distance control ECU 4 stops supplying the signal representing the braking demand to command releasing of the brake and processing returns to the main routing and jumps to step S11000 to repeat the operation. If the cruise control switch 13 is operated again during the above-mentioned operation, processing jumps to the step S10000 to set the target inter-vehicle distance time interval Td.

When the inter-vehicle distance control ECU 4 supplies the signal representing the braking demand to perform the braking operation to the brake ECU 6, the brake ECU 6 controls the brake actuator 21 in response to this signal to perform the braking operation. As the result, the braking operation by the brake actuator 21 reduces the velocity of the vehicle.

Figure 4:
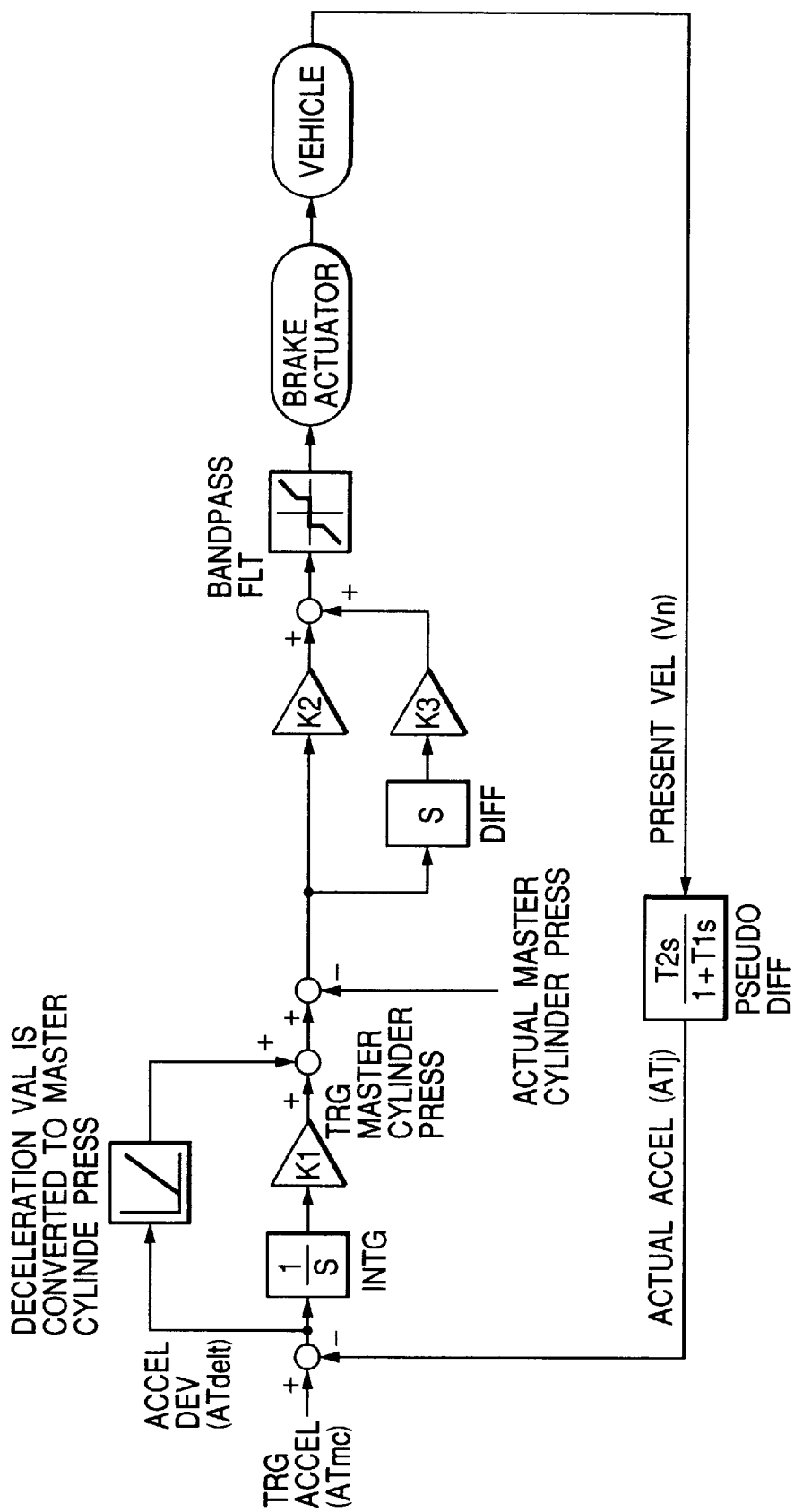
FIG. 4 is a block diagram of the embodiment showing structure of the brake system.

FIG. 4 is a block diagram of this embodiment showing the structure of the brake system controlled by the brake ECU 6.

The present velocity Vn is subjected to pseudo differentiation to calculate the actual acceleration ATj. The acceleration deviation ATdelt is deviation (difference) of the actual acceleration ATj from the target acceleration ATmc and is integrated to calculate the integration term. Moreover, the master cylinder pressure corresponding to the acceleration deviation ATdelt is obtained with reference to a predetermined data map. The integration term is added to the master cylinder pressure to calculate a target master cylinder pressure.

Next, a pressure deviation of the actual master cylinder pressure detected by the master cylinder pressure sensor 18 from the target master cylinder pressure is calculated. The proportional term and the differential term of the pressure deviation are added to each other and the added value is supplied to a bandpass filter to remove noise to obtain an increase and decrease pressure command value of the brake actuator 21.

The brake actuator 21 controls the braking operation of the vehicle by effecting the duty controlling between the atmospheric pressure and the negative engine pressure in accordance with the increase and decrease command value to obtain increase and decrease in pressure of the master cylinder. An actual acceleration ATdelt is calculated from a present vehicle velocity which is decreased by the braking operation and is fed back to the input of the control system.

As mentioned, in the automatic cruising controlling apparatus 2, the throttle opening angle and the master cylinder pressure are continuously controlled in accordance with increase and decrease in the acceleration deviation ATdelt to continuously control the acceleration. Here, it is desirable that upper limit and lower limit values of the acceleration and deceleration are specified in consideration of safeness.

Thus, in process for determining the target acceleration ATmc in step 15000, the upper limit of the target acceleration ATmc is determined to be 0.7 m/s$^2$ and the lower limit is determined to be −2.45 m/s$^2$. As mentioned above, specifying the upper limit value and the lower limit value of the target acceleration ATmc prevents rapid operation variation. As the lower limit of the acceleration, in FIG. 4, it is possible to use the value corresponding to the upper limit value of the target master cylinder pressure as the lower limit value (for example, −2.45 m/s$^2$). Moreover, these upper limit and lower limit values of the acceleration may be experimentally obtained.

Next, the controlling operation of the display 31 indicating the operation condition of the automatic cruising control apparatus 2 will be described in detail.

FIGS. 5A to 5D are illustrations of this embodiment showing the operation condition of the display 31.

The display 31 includes oblong LETs arranged in the vertical direction as similar to a level indicator. The uppermost arranged LED 31U and the lowermost arranged LED 31L have larger sizes than other LEDs and are driven to be flickered. At a predetermined position (level) of the indicator 31, a reference line SL indicating the target acceleration ATmc =0 m/s$^2$ is provided. The LEDs arranged above the reference line SL indicate positive values of the target acceleration ATmc and the LEDs arranged under the reference line SL represent negative value of the target acceleration ATmc.

Controlling the display 31 is performed after the target acceleration ATmc is obtained in step S15000. If the obtained target acceleration ATmc is a positive value, i.e., acceleration is demanded, the LEDs above the reference line SL, whose the number corresponds to the target acceleration ATmc are turned on. If the obtained target acceleration ATmc is a negative value, i.e., deceleration is demanded, the LEDs under the reference line SL, whose the number corresponds to the target acceleration ATmc are turned on. Then, if the target acceleration ATmc reaches the lower limit value, as shown in FIG. 5D, the lowermost arranged LED 31L flickers. Similarly, if the target acceleration ATmc reaches the upper limit value, the uppermost arranged LED 31U flickers.

As mentioned, according to this embodiment, it is possible to surely inform the driver that acceleration and deceleration abilities in the automatic cruising reach the upper limit and the lower limit, respectively, by indicating how near the target acceleration ATmc approaches to the specified upper limit or the lower limit with the display 31. Thus, the driver can judge how can the automatic cruise control apparatus further accelerate or decelerate the vehicle and the driver can surly recognize the acceleration and deceleration abilities by the automatic cruising apparatus 2 by the indication with the display 31. Thus, the driver can judge whether manual operation by the driver is necessary in accordance with the ability of acceleration and the deceleration.

That is, the judgement by the driver is affected by various conditions such as inclination of the road, weather, the condition of the driver, the type of the vehicle, the distance between the preceding vehicle and this vehicle and the distance between the vehicle and the following vehicle, the velocity of the vehicle, etc.). Thus, it is desirable that the driver can judge the transition timing from the automatic cruising control to the manual operation (the braking operation or the throttle operation) by himself. According to this embodiment, the driver can recognize whether the acceleration and deceleration ability in the automatic cruising apparatus 2 is approaching to a limit value, so that it is easy to judge the transition timing from the automatic cruising control to the manual operation. Thus, the driver does not feel uncertainty in the operation of the automatic cruising control apparatus 2 even in the cases that the deceleration by the automatic cruising control apparatus 2 reaches the upper limit, the deceleration does not reach the upper limit but the driver does not know there is a margin in deceleration and acceleration ability by the automatic cruising apparatus. Thus, unpleasant felling accompanied with control by the automatic cruising control apparatus 2 can be eliminated.

This invention is not limited to the above-mentioned embodiment and may be modified.

(1) In the above-mentioned embodiment, the display 31 displays the target acceleration ATmc. However, it is also possible to display the controlling target values in the braking control system and the throttle control system as shown in FIG. 4, for example, the target master cylinder pressure, a target torque, etc., or actual acceleration ATj which is outputted as the result of the control target values.

Here, displaying the actual acceleration ATj on the display 31 directly indicates the control limits of the automatic cruising control apparatus 2 without affection due to response delay from the control system against the target control value. For example, indication shown in FIG. 5D shows that the actual acceleration ATj is under the lower limit of the target acceleration ATmc. The target acceleration ATmc should be controlled up to the lower limit value, so that the acceleration deviation ATdelt obtained instep S17000 necessarily shows a positive value. Thus, the control system continuously controlled in accordance with the acceleration deviation ATdelt showing the positive value tends to necessarily accelerate the vehicle in accordance with the condition at that timing. Accordingly, when the display 31 displays the display condition as shown in FIG. 5D, the driver can easily judge that the braking operation by the driver himself is necessary from the distance between the preceding vehicle and this vehicle because it is impossible to decelerate the vehicle unless much variation in travelling resistance occurs.

Figure 6:
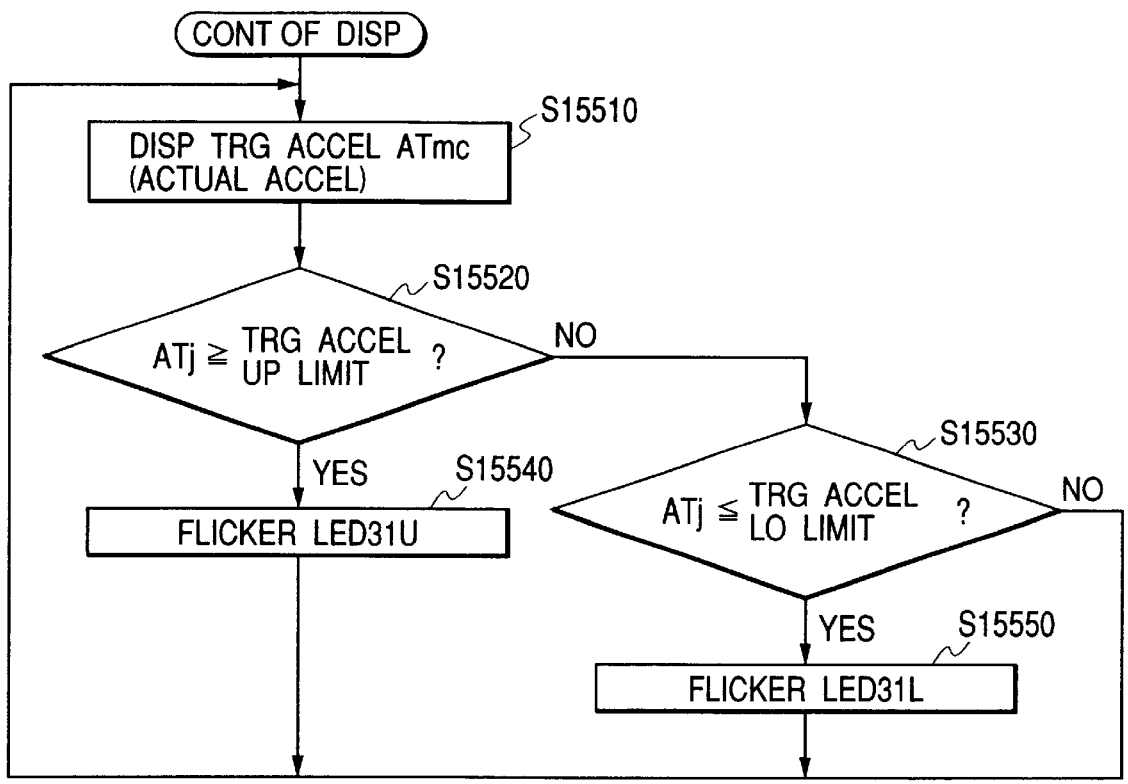
FIG. 6 depicts a flow chart of the embodiment showing operation of the display.

(2) FIG. 6 depicts a flow chart of this embodiment showing operation of the display 31.

Controlling the display 31 is executed after the target acceleration ATmc is obtained in step S15000 and the actual acceleration ATj is obtained in step S16000.

At first, in step S15510, LEDs corresponding to the obtained target acceleration (deceleration) ATmc are turned on (FIGS. 5B, 5C). In the following step S15520, it is judged whether the obtained actual acceleration ATj is equal to or greater than the upper limit of the target acceleration ATmc. If the obtained actual acceleration ATj is equal to or greater than the upper limit of the target acceleration ATmc (Yes, in step S15520), processing proceeds to step S15540 and if the obtained actual acceleration ATj is smaller than the upper limit of the target acceleration ATmc (No, in step S15520), processing proceeds to step S15530.

In step S15540, the uppermost arranged LED 31U is flickered and then, processing returns to step S15510.

In step S15530, it is judged whether the obtained actual acceleration ATj is equal to or smaller than the lower limit of the target acceleration ATmc. If the obtained actual acceleration ATj is equal to or smaller than the lower limit of the target acceleration ATmc (Yes, in step S15530), processing proceeds to step S15550 and if the obtained actual acceleration ATj is greater than the lower limit of the target acceleration ATmc (No, in step S15530, processing returns to step S15510.

In step S15540, the lowermost arranged LED 31L is flickered (FIG. 5D) and then, processing returns to step S15510.

In step S15510, LEDs corresponding to the new received actual acceleration are turned on (FIGS. 5B, 5C).

As mentioned above, the target acceleration ATmc is displayed with the display 31 and the LEDs 31U and 31L are flickered when the actual acceleration ATj exceeds the control limit values.

(3) Moreover, it is not necessary to provide the display 31 on the instrumental panel of the vehicle but it is also possible to provide it on a visible position inside the room of the vehicle.

(4) Moreover, in the above-mentioned embodiments, the acceleration and deceleration conditions are visually informed with the display 31. However, it is also possible to inform the driver of it with alarm sound or a sound message. Moreover, it is also possible to inform the driver of it with combination of the visual informing and acoustic informing. For example, the acoustic informing may be performed only when either of LED 31U or 31L is flickered.

(5) Moreover, in the above-mentioned embodiment, it is informed how nearly are the acceleration and deceleration abilities of the automatic cruising control apparatus 2 approaching to the upper and lower limits. However, it is also possible to inform which decelerating means (which one of decelerators such as engine brake) is used if a part of a plurality of decelerators (cutting off fuel, down-shifting, the brake, etc.) are used in order of braking force to the vehicle.

Figure 7:
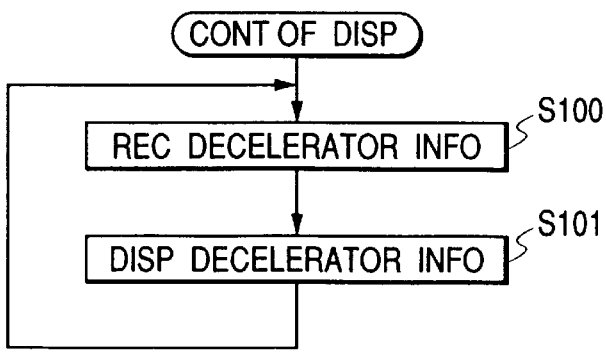
FIG. 7 depicts a flow chart showing operation of the display shown in FIG. 1.

That is, in the above-mentioned embodiment, the braking force increases in order from the fuel cutting off (S19000), the overdriving cutting off (S20000), down-shifting (S210009, to the brake (S22000), so that the deceleration operation is effected by using these deceleration processes in this order. Thus, it is desirable that the driver is informed of which decelerator is presently used by visual informing or acoustic informing. FIG. 7 depicts a flow chart showing this operation. In step S100, the display unit 12 receives decelerator information indicative of the decelerator being used and the following step, the display 31 displays the decelerator information to indicate one of decelerator being used in step S101.

As mentioned above, the driver can judge what degree of spare (margin) deceleration is remained in accordance with the presently executed deceleration processes, so that the driver can judge himself that the manual braking operation is necessary.

Moreover, it is also possible to provide information that the deceleration operation finally executed in the deceleration operation in FIG. 2 (greatest deceleration force) when the final deceleration operation is executed in the deceleration operation in FIG. 2.

That is, in the above-mentioned embodiment, the deceleration process by the brake in step S22000 is finally executed, so that it is also possible to inform the driver of the finally executed decelerator when the deceleration operation by the brake is effected with the visual and/or acoustic information.

Figure 8:
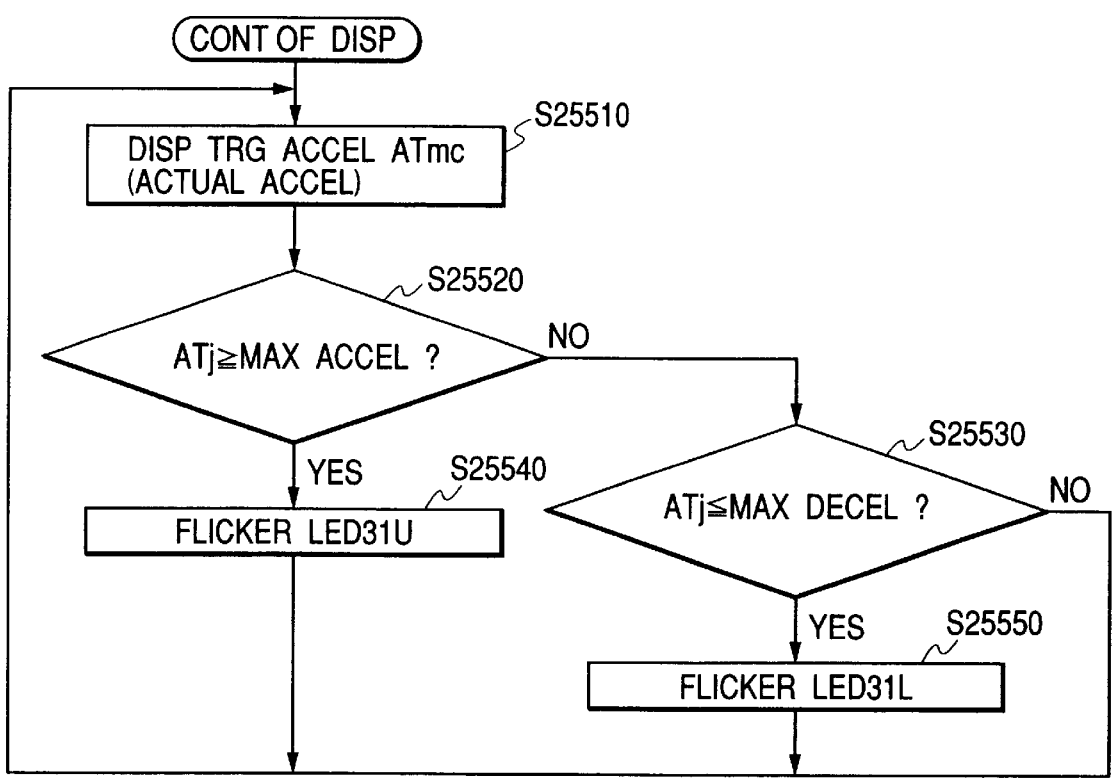
FIG. 8 depicts a flow chart of another example showing operation of the display shown in FIG. 1.

FIG. 8 depicts a flow chart of another example showing operation of the display 31.

Controlling the display 31 is executed after the target acceleration ATmc is obtained in step S15000 and the actual acceleration ATj is obtained in step S16000.

At first, in step S25510, LEDs corresponding to the obtained target acceleration ATmc are turned on (FIGS. 5B, 5C). In the following step S25520, it is judged whether the obtained actual acceleration ATj is equal to or greater than the maximum of acceleration force (ability) in the automatic cruising. If the obtained actual acceleration ATj is equal to or greater than the maximum of acceleration force (Yes, in step S25520), processing proceeds to step S25540 and if the obtained actual acceleration ATj is smaller than the maximum acceleration force (No, in step S25520), processing proceeds to step S25530.

In step S25540, the uppermost arranged LED 31U is flickered and then, processing returns to step S25510.

In step S25530, it is judged whether the obtained actual acceleration ATj is equal to or smaller than the maximum deceleration force (ability) in the automatic cruising. If the obtained actual acceleration ATj is equal to or smaller than the maximum deceleration force (Yes, in step S25530), processing proceeds to step S2550 and if the obtained actual acceleration ATj is greater than the maximum acceleration force (No, in step S25530, processing returns to step S25510.

In step S25540, the lowermost arranged LED 31L is flickered (FIG. 5D) and then, processing returns to step S25510.

In step S25510, LEDs corresponding to the new actual acceleration are be turned on (FIGS. 5B, 5C).

As mentioned above, the driver can recognize that the automatic cruising control apparatus 2 cannot further decelerate the vehicle at the deceleration force (ability) greater than the deceleration force provided at the timing.

In step S25520, the maximum of acceleration force is defined only for the automatic cruising controlling. That is, the driver can generate a greater acceleration of the vehicle by operating the acceleration pedal. Moreover, in step S25530, the maximum of deceleration force (ability) is defined only for the automatic cruising controlling. That is, the driver can generate a greater deceleration of the vehicle by operating the brake pedal.

(6) Moreover, it is also possible to provide various deceleration operations to obtain the necessary deceleration force in addition to the above-mentioned deceleration operations by cutting off fuel, cutting off overdriving, down-shifting, and braking. For example, deceleration operation by retarding the ignition timing, locking up the torque converter, exhaust gas braking by increasing a flowing resistance of exhaust gas from the engine, or a retarder, is selectively effected or a part of them are effected.

In this case, it is desirable to effect one of the deceleration operations in order of deceleration force. Moreover, it is also effective to inform which deceleration operation is presently executed. Moreover, it is also effective to inform the driver of the deceleration operation finally executed (greatest braking force) when the deceleration operation to be finally executed is performed.

(7) Moreover, another deceleration may be provided. That is, in the deceleration process (S21000), down-shifting by more than one shift positions provide further strong engine braking. The number of shift positions in such down-shifting is determined in accordance with the number of shift positions and the reduction gear ratio of the transmission 17.

Similarly, in the overdriving cutting off deceleration process (S20000), if a fifth shift position (overdriving) is used, down-shifting may be effected to the third shift position, so that a great engine brake force is developed to decelerated the vehicle. That is, in the deceleration process by cutting off the overdriving, down-shifting by more than one shift positions provides further strong engine braking. The number of shift positions in such down-shifting is determined in accordance with the number of shift positions and the reduction gear ratio of the transmission 17.

In the above-mentioned embodiment, the automatic cruising maintains the target interval. However, the present invention is applicable to the automatic cruising which maintains the distance between the proceeding vehicle and this vehicle. Moreover, in the above-mentioned embodiment, the value corresponding to an actual distance between the vehicle and a preceding vehicle is detected or the value corresponding to a target distance between the vehicle and a preceding vehicle is detected. This is because automatic cruising can be provided by not only detecting the actual distance between the proceeding vehicle and this vehicle but also the time interval necessary for traveling the distance between the proceeding vehicle and this vehicle or other corresponding physical amounts.

In the above-mentioned embodiment, either of a target torque, a target throttle opening angle, or a target brake pressure may be used as a target control value. Moreover, either of an actual torque, an actual throttle opening angle, or an actual brake pressure may be used as an actual control value.

What is claimed is:
1. An automatic cruising control apparatus for a vehicle including acceleration and deceleration means comprising:
   detecting means for detecting a value corresponding to an actual distance between said vehicle and a preceding vehicle;
   acceleration and deceleration detecting means for detecting actual acceleration and deceleration of said vehicle;
   acceleration and deceleration control means for controlling acceleration and deceleration of said vehicle in accordance with a target control value;

determining means for determining said target control value so as to equalize said value to a target value corresponding to a target distance between said vehicle and said preceding vehicle; and informing means for informing of occurrence of an event to a driver of said vehicle when least one of said target control value and an actual control value of said vehicle reaches a predetermined threshold value which is near an operation limit value of said acceleration and deceleration means occurs.

2. An automatic cruising control apparatus as claimed in claim 1, wherein said target control value indicates a target acceleration.

3. An automatic cruising control apparatus as claimed in claim 1, wherein said actual control value indicates an actual acceleration.

4. An automatic cruising control apparatus for a vehicle including acceleration and deceleration means comprising:

detecting means for detecting a value corresponding to an actual distance between said vehicle and a preceding vehicle;

acceleration and deceleration detecting means for detecting actual acceleration and deceleration of said vehicle;

acceleration and deceleration control means for controlling acceleration and deceleration of said vehicle in accordance with a target control value;

determining means for determining said target control value so as to equalize said value to a target value corresponding to a target distance between said vehicle and said preceding vehicle; and informing means for informing a driver of said vehicle how closely at least one of said target control value and said actual acceleration approaches to an operation limit value of said acceleration and deceleration means.

5. An automatic cruising control apparatus as claimed in claim 4, wherein said target control value indicates a target acceleration.

6. An automatic cruising control apparatus as claimed in claim 4, wherein said actual control value indicates an actual acceleration.

7. An automatic cruising control apparatus for a vehicle comprising:

detecting means for detecting a value corresponding to an actual distance between said vehicle and a preceding vehicle;

acceleration and deceleration control means for controlling acceleration and deceleration of said vehicle so as to equalize said value to a target value corresponding to a target distance between said vehicle and said preceding vehicle, wherein said acceleration and deceleration control means includes a plurality of deceleration means having different deceleration abilities to said vehicle, a part of a plurality of said deceleration means being selectively operated; and informing means for informing a driver of said vehicle that a total of deceleration derived by said part of a plurality of said deceleration means agrees with a maximum deceleration force of a plurality of said deceleration means, when said total of deceleration derived by said part of a plurality of said deceleration means agrees with said maximum deceleration force of a plurality of said deceleration means.

8. An automatic cruising control apparatus for a vehicle comprising:

detecting means for detecting a value corresponding to an actual distance between said vehicle and a preceding vehicle;

acceleration and deceleration control means for controlling acceleration and deceleration of said vehicle so as to equalize said value to a target value corresponding to a target distance between said vehicle and said preceding vehicle, wherein said acceleration and deceleration control means includes a plurality of deceleration means having different deceleration abilities to said vehicle, a part of a plurality of said deceleration means being selectively operated; and informing means responsive to said acceleration and deceleration control means for informing a driver how closely said deceleration approaches to an operation limit value of at least of said plurality of said deceleration means which is being operated.

9. The automatic cruise control apparatus of claim 8, wherein said plurality of deceleration means comprises at least one of cutting off fuel, down-shifting, and braking.

* * * * *